Jan. 23, 1923.
B. C. COONS.
SEED CELL REMOVING APPARATUS.
FILED MAR. 10, 1922.
1,442,859
2 SHEETS-SHEET 1
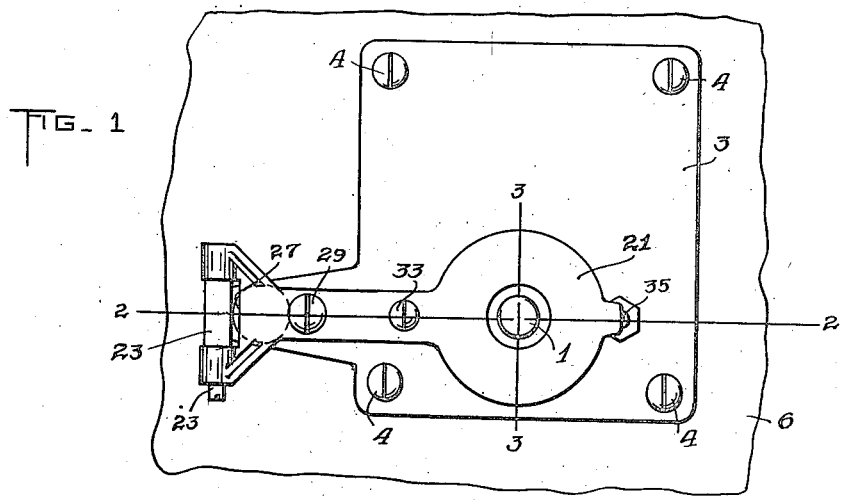
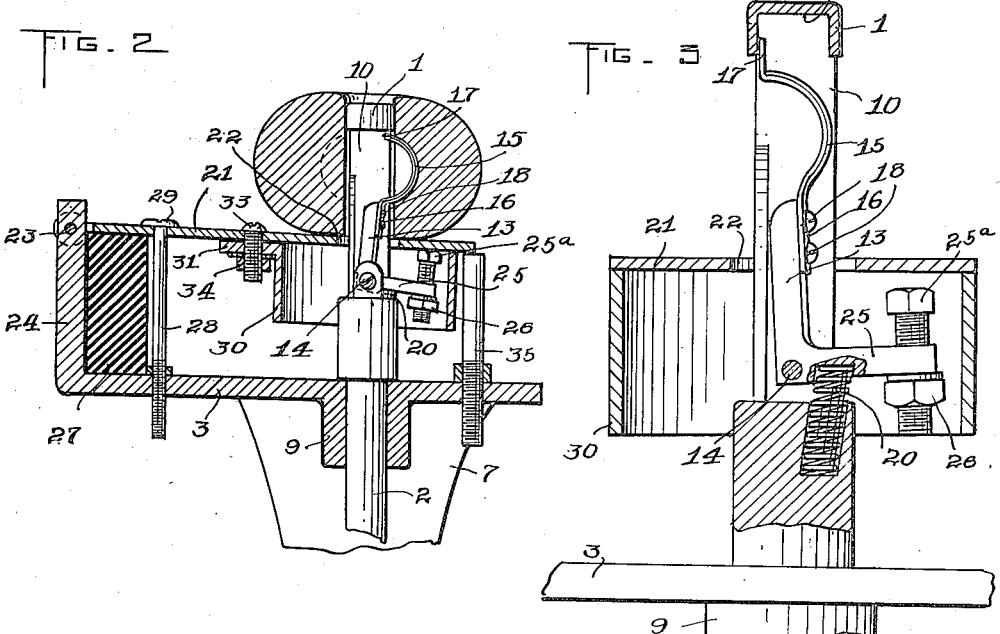
INVENTOR.
Burton C. Coons
BY
his ATTORNEYS.

Jan. 23, 1923.
B. C. COONS.
SEED CELL REMOVING APPARATUS.
FILED MAR. 10, 1922.
1,442,859
2 SHEETS-SHEET 2
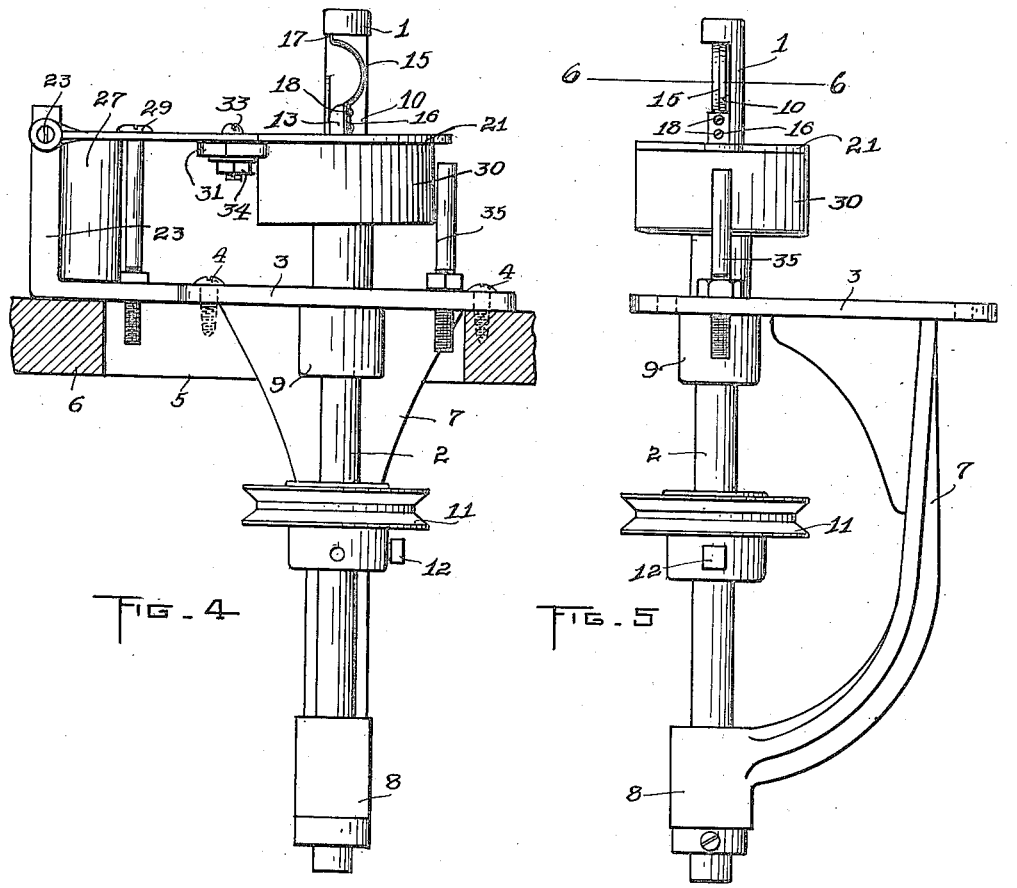
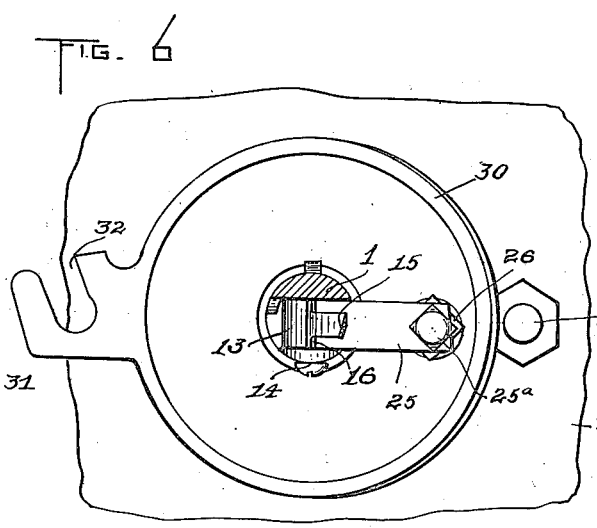
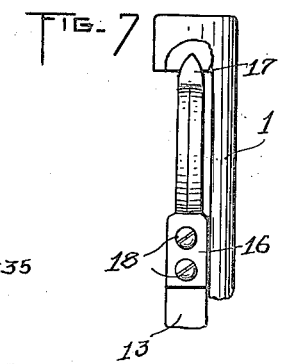
INVENTOR.
Burton C. Coons
BY
his ATTORNEYS.

Patented Jan. 23, 1923.

1,442,859

UNITED STATES PATENT OFFICE.

BURTON C. COONS, OF ROCHESTER, NEW YORK, ASSIGNOR TO COONS MANUFACTURING COMPANY, INC., OF ROCHESTER, NEW YORK, A CORPORATION OF NEW YORK.

SEED-CELL-REMOVING APPARATUS.

Application filed March 10, 1922. Serial No. 542,734.

*To all whom it may concern:*

Be it known that I, BURTON C. COONS, a citizen of the United States, and resident of Rochester, in the county of Monroe and State of New York, have invented certain new and useful Improvements in Seed-Cell-Removing Apparatus, of which the following is a specification.

The present invention relates to a seed cell removing apparatus and more particularly to a construction which will remove the seed cells from apples which have been pared and cored by paring machines, the latter removing a cylindrical core from each apple while leaving portions of the seed cell within the apple.

An object of this invention is to provide a seed cell removing apparatus which is driven by power and has a cell removing knife normally lying in an inoperative position and adapted to be projected to an operative position when a cored apple is properly positioned on the apparatus.

To these and other ends, the invention consists of certain parts and combinations of parts, all of which will be hereinafter described: the novel features being pointed out in the appended claims.

In the drawings:
Fig. 1 is a plan view of an apparatus constructed in accordance with the invention;

Fig. 2 is a sectional view on the line 2—2, Fig. 1, showing the knife operating on an apple;
Fig. 3 is an enlarged section on the line 3—3, Fig. 1, showing the knife shaft shifted and the knife in inoperative position;

Fig. 4 is a view showing the apparatus in side elevation;
Fig. 5 is another side view of the apparatus;

Fig. 6 is an enlarged sectional view on the line 6—6, Fig. 5, looking in a downward direction, the operating member being removed; and Fig. 7 is a fragmentary view showing the manner in which the cell removing device projects into a pocket at the upper end of the support.
The commercial apple paring machine of today, in addition to paring the apple removes from the apple a cylindrical core of uniform diameter throughout its length. In order that too much waste may not take place the diameter of the core is less than the diameter of the seed cell or pocket in the center of the apple and it is now customary to quarter the apple, and then, by hand labor, to remove the remaining portions of the seed cell or pocket. This hand labor is not only expensive but the operatives in removing the seed cell or pocket remove a quantity of desirable material from the apple, thus making this method very expensive.

The apparatus forming the subject matter of this invention receives the apple after the latter has been pared and cored and before such an apple has been quartered. For supporting the apple during the seed cell removing operation, the apparatus employs a supporting device, which, in this instance, is indicated in the drawing at 1 and is of cylindrical formation except that it is provided with a cutaway portion or pocket 10 below the upper end of the support, this upper end maintaining the cylindrical form in order to permit the fitting of a cored and pared apple over it. Support 1 is preferably secured at one end of shaft 2, journalled in a frame comprising a plate 3, secured by screws 4 over an opening 5 in table 6; an arm 7, forming part of the frame depending from the plate 3 through the opening 5 in the table and provided with a bearing 8 at its lower end in which the shaft 2 turns, the shaft also turning in a bearing 9 cast integrally with the plate 3 on the under side of the latter. Operation of shaft 2 may be effected in any suitable manner. In this instance, a pulley 11 is arranged on the shaft and is secured thereto by set screw 12 being driven from any suitable source of power.

The seed cell coring or removing device in the illustrated embodiment of the invention comprises a knife holder 13 which, in this instance, is in the form of a bell crank member pivoted at 14 at the junction of its arms, one arm lying in the pocket 10 while the other arm projects from the pocket and laterally from the support 1. This knife holder carries on its arm within the pocket, a knife which has a curved or U shaped portion 15 and portions 16 and 17 projecting outwardly from opposite ends of the U shaped portion 15. The portion 16 is secured by screws 18 to the arm of the bell crank knife holder lying in the pocket 10, while the arm 17 projects into a pocket 19 which opens downwardly toward the pocket 10 at the upper end of the latter. The arm 17 cooperates with the walls of the pocket 19 and limits this movement of the seed cell coring device in two directions. In order to give the seed cell coring and removing device a normal tendency to lie within the pocket 10, suitable means may be provided which, in this instance, is in the form of helical spring 20 secured to the rotary support 1 and bearing against the outwardly projecting arm of the bell crank lever 13.

With the end in view of effecting the projection of the knife of the cell coring or removing device from the pocket 10, after the cored apple has been fitted to the support 1, means is provided through which the projection is effected automatically when the apple has reached the desired position of the supporting device. This means, in this instance, embodies a plate or operating member 21 formed with an opening 22 through which the supporting device 1 extends, this plate being in position above the laterally extending arm on the cell coring or removing device and being pivoted at 23 on a bracket 24 formed integrally with the plate 3, the axis of turning this plate 21 being to one side of the supporting device 1 and at a right angle to the axis of turning of the support 1. This plate or operating member 21 connects with the seed cell coring device preferably through the laterally projecting arm of the bell crank knife holder 13, the latter to this end having on the laterally projecting arm 25, an adjustable abutment 25ª in the form of a screw turning in the arm and held in its adjusted position by a locking nut 26, the head of the screw lying on the under face of operating member 21. So that the operating member may normally occupy a position where the seed cell coring device will be housed within the supporting device 1, there is provided a means which, in this instance, is in the form of a resilient member 27 adjacent the pivot 23 of the latter, this device being held against the bracket 24 by a confining pin 28 secured to the frame 3 and projecting upwardly from the latter through an opening in the member 21 where it is provided with a head 29 acting to limit the upward movement of the operating member. Downward movement of the operating member may be limited by a stop pin 35 projecting upwardly from the plate 3 and cooperating with the under side of the operating member.

There may also be provided a guard for the projecting arm of the cell coring device and parts cooperating therewith. This guard, in this instance, is in the form of a ring 30 secured to the under side of the member 21, about the supporting device 1, in this instance, by a lug 31 projecting laterally from the upper edge of the ring 30 and having a slot 32 at the opening at one side of the lug. Through this slot a bolt 33 is passed, such bolt passing through the operating member 21 and having a nut 34 thereon which, with the bolt, serves to secure ring 30 to the member 21. The laterally opening slot will permit the lateral disconnection of the ring 30 from the operating member 21 on the loosening of the bolt 33.

In the operation of the invention, the apples, after they have been pared and cored, are then carried to what is known as the "trimmer's" table which is a table around which a number of women sit whose duty it is to trim the apple of unpared and defective portions. These "trimmers" take the apples one at a time and place them upon the supporting device 1 which rotates constantly. When the apple engages the operating plate 2, the seed cell removing device swings outwardly and removes from the cored apple on the supporting device 1, the portions of the seed cell remaining in the apple. The apple is then withdrawn from the seed device and the "trimmer" proceeds to quarter the apple by hand, at the same time, inspecting the same for any imperfections or unpared portions. The seed cell removing device is shaped so that it will remove a seed cell of average size and, as a consequence, the waste is reduced to a minimum. Furthermore, the seed cell is removed at one time from all four quarters of the apple, thus dispensing with the separate handling of each quarter after the quartering operation. Owing to the fact that the coring device is rotating constantly, it automatically cleans itself by centrifugal force between each coring operation.

It will be noted that the pocket in the rotary support serves to house the cutter, when in inoperative position, so that danger to the operative is eliminated.

What I claim as my invention and desire to secure by Letters Patent is:

1. In combination with a supporting frame, a rotary support for a cored apple, a shaft mounted on said frame to which said support is connected and through which it is turned, a seed cell corer movably mounted on said support and having a normal position on the support where it may pass into the core of the apple, and means operated by the apple when fitted to the support for effecting the movement of the said coring device on the support to a position where it will effect the removal of the seed cell of an apple fitted to the support.

2. A seed cell removing apparatus comprising a rotary seed cell coring device having a movement away from its axis of rotation in order to be expanded within an apple, an operating member held against turning with the apple and arranged to be engaged by the apple when the latter is in operative relation to the seed cell coring device for the purpose of moving the latter with the seed cell coring device outwardly with reference to the axis of rotation.

3. A seed cell removing apparatus comprising a rotary support for a cored apple having a pocket, a seed cell coring device arranged in said pocket and adpted to be projected beyond the support to extend within a seed cell of the apple on the rotatary supporting device, and an operating means for said seed cell coring device held against turning with the rotary support and engaged by an apple fitted on the support to effect the movement of the seed cell coring device from the pocket.

4. In combination with a rotary support for a cored apple, a seed cell corer pivotally mounted on said support to turn about an axis extending transversely of the axis of turning of the support, and an operating means for said seed cell corer operated by pressure of a cored apple fitted to the support.

5. A seed cell removing apparatus for cored apples comprising a rotary support having a pocket, a seed cell corer pivotally mounted in said pocket and adapted to be projected beyond the support, and an operating member for the seed cell corer held against turning with the support and adapted to be engaged by a cored apple fitted to the support for projecting the seed cell corer from the pocket.

6. A seed cell removing apparatus for cored apples comprising a rotary support having a pocket, a seed cell corer pivotally mounted in said pocket adapted to be projected beyond the support, and an operating member for the seed cell corer held against turning with the support and adapted to be engaged by a cored apple fitted to the support for projecting the seed cell corer from the pocket, said operating member being mounted to turn about an axis extending transversely of the axis of the rotation of the support.

7. A seed cell removing apparatus for cored apples comprising a rotary support having a pocket, a seed cell corer pivotally mounted in said pocket adapted to be projected beyond the support, and an operating member for the seed cell corer held against turning with the support and adapted to be engaged by a cored apple fitted to the support for projecting the seed cell corer from the pocket, said operating member being mounted to turn about an axis extending transversely of the axis of the rotation of the support, resilient means opposing the movement of said operating member.

8. A seed cell removing apparatus for cored apples comprising a rotary support having a pocket, a seed cell corer pivotally mounted in said pocket and adapted to be projected beyond the support when a cored apple is fitted to the support, and a spring for normally maintaining the seed cell corer within the pocket.

9. A seed cell removing apparatus for cored apples comprising a rotary support, a seed cell corer movably mounted in an inoperative position on the support and adapted to be projected to an operative position, and a spring acting on the seed cell corer for maintaining the same normally in an inoperative position.

10. A seed cell removing apparatus for cored apples comprising a rotary support having a pocket, a seed cell corer pivotally mounted within the pocket and having an arm extending laterally from the pocket, and stationary means adapted to be engaged by a cored apple fitted to the support to cooperate with the arm for effecting the movement of the seed cell corer from the pocket.

11. A seed cell removing apparatus for cored apples comprising a rotary support having a pocket and also a pocket at one end of the first named pocket, a seed cell corer pivotally mounted on the support to turn about an axis extending transversely of the axis of turning of the support, said seed cell corer lying in the first named pocket and having a portion extending into the second mentioned pocket to cooperate with the walls of the latter in order to limit the movement of the seed cell corer, and an operating means for said seed cell corer engaged by a cored apple fitted to the support.

12. In a seed cell removing apparatus for cored apples the combination with a rotary support having a pocket and also a pocket at one end of the first named pocket, a seed cell corer embodying a bell crank knife holder pivotally mounted within the pocket to turn about an axis transversely of the axis of rotation of the rotary support, and a knife of U shape having two arms, one secured to one arm of the knife holder and the other projecting into the second mentioned pocket to cooperate with the walls of the latter in order to limit the movement of the seed cell corer in two directions, of operating means for the seed cell corer cooperating with the other arm of the bell crank knife holder and engaged by a cored apple fitted to the support.

13. A seed cell removing apparatus for cored apples comprising a rotary support having a pocket, a seed cell corer movably mounted in said pocket and adapted to be projected beyond the support, an operating member for the seed cell corer having an opening through which the rotary support extends, said operating member being pivotally mounted to one side of the support, and resilient means opposing the movement of the operating member to project the seed cell corer from the pocket.

14. A seed cell removing apparatus for cored apples comprising a supporting frame, a rotary support for a cored apple, a shaft mounted to turn in the frame and to which the rotary support is connected and through which it is turned, a seed cell corer movably mounted on the support and having a normal position on the latter where it may pass into the core of the apple, and operating means for said seed cell corer adapted to be engaged by a cored apple fitted to the support to effect the movement of the coring device to a position on the support where it will effect the removal of a seed cell of an apple fitted to the support.

15. A seed cell removing apparatus comprising a rotary support for a cored apple, a seed cell corer pivotally mounted on the support to turn about an axis transversely of the axis of turning of the support, said seed cell corer having a laterally projecting arm, an operating member held against turning with the support and having an opening through which the support extends, said operating member being adapted to be engaged by an apple fitted to the support for the purpose of removing the seed cell corer to a position where it will effect the removal of the seed cell of an apple fitted to the support.

16. A seed cell removing apparatus comprising a rotary support, a seed cell corer movably mounted on the support and having a normal position on the latter where it may pass into the core of an apple fitted to the support, and adapted to be operated by pressure of an apple fitted to the support for effecting the movement of said coring device on the support to a position where it will effect the removal of a seed cell of an apple on the support, said seed cell corer having a form that effects the clearing thereof through centrifugal force on the rotation of the support.

17. A seed cell removing apparatus for cored apples comprising a rotary support, a seed cell corer movably mounted on the support, and an operating member for the seed cell corer, held against turning with the seed cell corer and connected with the latter for effecting the movement of said corer to a position where the corer will remove the seed cell of an apple fitted to the support, said operating member having means for enclosing the connection with the seed cell corer.

18. A seed cell removing apparatus for cored apples comprising a rotary support, a seed cell corer movably mounted on the support and having an arm extending laterally from the support, an operating member for the seed cell corer having an opening through which the rotary support extends and held against turning with the support, and a guard on the operating member surrounding said arm on the corer.

19. The combination with a rotary support having a free end over which the cored apple is adapted to be fitted, and means for turning the support, of a seed cell corer movable on the support toward and from the axis of the latter, and means engageable by a cored apple, after it has been fitted on the support, which yields by pressure of the apple thereon in the direction of the axis of rotation away from the free end of the support to effect the movement of the seed cell corer on the support.

20. The combination with a rotary support having a free end over which the cored apple is adapted to be fitted, means for turning the support, of a seed cell corer mounted on the support and movable outwardly relatively to the axis of the support, and a device engageable by a cored apple fitted to the support and cooperating with said seed cell corer to effect the movement of the corer outwardly on the support, one of said last two named elements being moved outwardly relatively to the other parallel with the axis of the support away from the free end of such support to effect the outward movement of the seed cell corer.

21. The combination with a rotary support having a free end over which the cored apple is adapted to be fitted, means for turning the support, of a seed cell corer mounted on the support and movable outwardly relatively to the axis of the support, a device engageable by a cored apple fitted to the support and cooperating with said seed cell corer to effect the movement of the corer outwardly on the support, one of said last two named elements being moved outwardly relatively to the other parallel with the axis of the support away from the free end of such support to effect the outward movement of the seed cell corer, and yielding means resisting the movement of said element and returning the same to normal position.

22. The combination with a rotary support having a free end over which the apple is adapted to be fitted to the support, and means for turning the support, of a seed cell corer mounted on the support and movable thereon toward and from the axis of the latter, an operating device for the seed cell corer movable axially of the support away from the free end of the latter to move the seed cell corer outwardly.

23. The combination with a rotary support having a free end over which the apple is adapted to be fitted to the support, means for turning the support, of a seed cell corer mounted on the support and movable thereon toward and from the axis of the latter, an operating device for the seed cell corer movable axially of the support away from the free end of the latter to move the seed cell corer outwardly, and yielding means resisting the movement of such operating device and returning the same to normal position.

24. The combination with a rotary support having a free end over which the cored apple is adapted to be fitted, means for turning the support, of a seed cell corer movable on the support toward and from the axis of the latter, and a device cooperating with the seed cell corer to effect the movement of the seed cell corer outwardly on the support, said device being held against turning with the support, one of the last two named elements being movable in the direction of the axis of rotation of the support to effect the outward movement of the corer.

BURTON C. COONS.